United States Patent
Parkes et al.

(10) Patent No.: US 8,229,792 B2
(45) Date of Patent: Jul. 24, 2012

(54) REAL-TIME SALES SYSTEM

(75) Inventors: Sharon Anne Parkes, Sunnybank (AU); Lennard Thomas Walbank, Mudgeeraba (AU)

(73) Assignee: Real Time Innovations Pty Ltd (AU)

( * ) Notice: Subject to any disclaimer, the term of this patent is extended or adjusted under 35 U.S.C. 154(b) by 210 days.

(21) Appl. No.: 12/306,615

(22) PCT Filed: Jun. 26, 2007

(86) PCT No.: PCT/AU2007/000885
§ 371 (c)(1), (2), (4) Date: Jan. 15, 2009

(87) PCT Pub. No.: WO2008/000025
PCT Pub. Date: Jan. 3, 2008

(65) Prior Publication Data
US 2009/0319398 A1    Dec. 24, 2009

(30) Foreign Application Priority Data
Jun. 26, 2006 (AU) ................ 2006903411

(51) Int. Cl.
*G06Q 30/00* (2006.01)

(52) U.S. Cl. ............. 705/26; 705/27; 705/14; 705/21; 709/206; 709/203; 707/104.1

(58) Field of Classification Search ............ 705/27, 705/26, 14, 16, 18, 21; 709/206
See application file for complete search history.

(56) References Cited

U.S. PATENT DOCUMENTS

| | | | |
|---|---|---|---|
| 7,363,246 B1 * | 4/2008 | Van Horn et al. | 705/26 |
| 7,529,689 B2 * | 5/2009 | Rowan | 705/26 |
| 2002/0082946 A1 * | 6/2002 | Morrison et al. | 705/27 |
| 2004/0030607 A1 * | 2/2004 | Gibson | 705/26 |
| 2005/0289042 A1 | 12/2005 | Friesen | |
| 2010/0082451 A1 * | 4/2010 | Bryson | 705/26 |

FOREIGN PATENT DOCUMENTS

| | | |
|---|---|---|
| CA | 2394575 | 6/2000 |
| CA | 2350994 | 12/2002 |
| WO | 01/53913 | 7/2001 |

OTHER PUBLICATIONS

International Search Report dated Jul. 26, 2007, for Application No. PCT/AU2007/000885.

* cited by examiner

*Primary Examiner* — Vanel Frenel
(74) *Attorney, Agent, or Firm* — Hayes Soloway P.C.

(57) ABSTRACT

The invention resides in a system (10) for real-time on-line sales comprising a database (11) for storing details of products, prices and other information. The database (11) is accessed by multiple sales controller computers (12). Each sales controller computer (12) runs sales controller application (13) which displays a sales controller interface. A sales controller (14), such as an auctioneer, monitors on-line sales activity via the interface. Sales controllers maybe in different physical locations. Multiple buyers (15) participate in real-time on-line sales via a buyer interface displayed by buyer application (16) running on a buyer computer (17). Buyer computers (17) communicate with one or more sales controller computers (12) via a communications channel (18) allowing each buyer application (16) to display multiple price clocks from multiple sales controller applications (13) in potentially different businesses/locations. Buyer computers (17) also communicate with a database (11) via communication channel (19) to access product information.

19 Claims, 5 Drawing Sheets

REAL-TIME SALES SYSTEM

Figure 1:
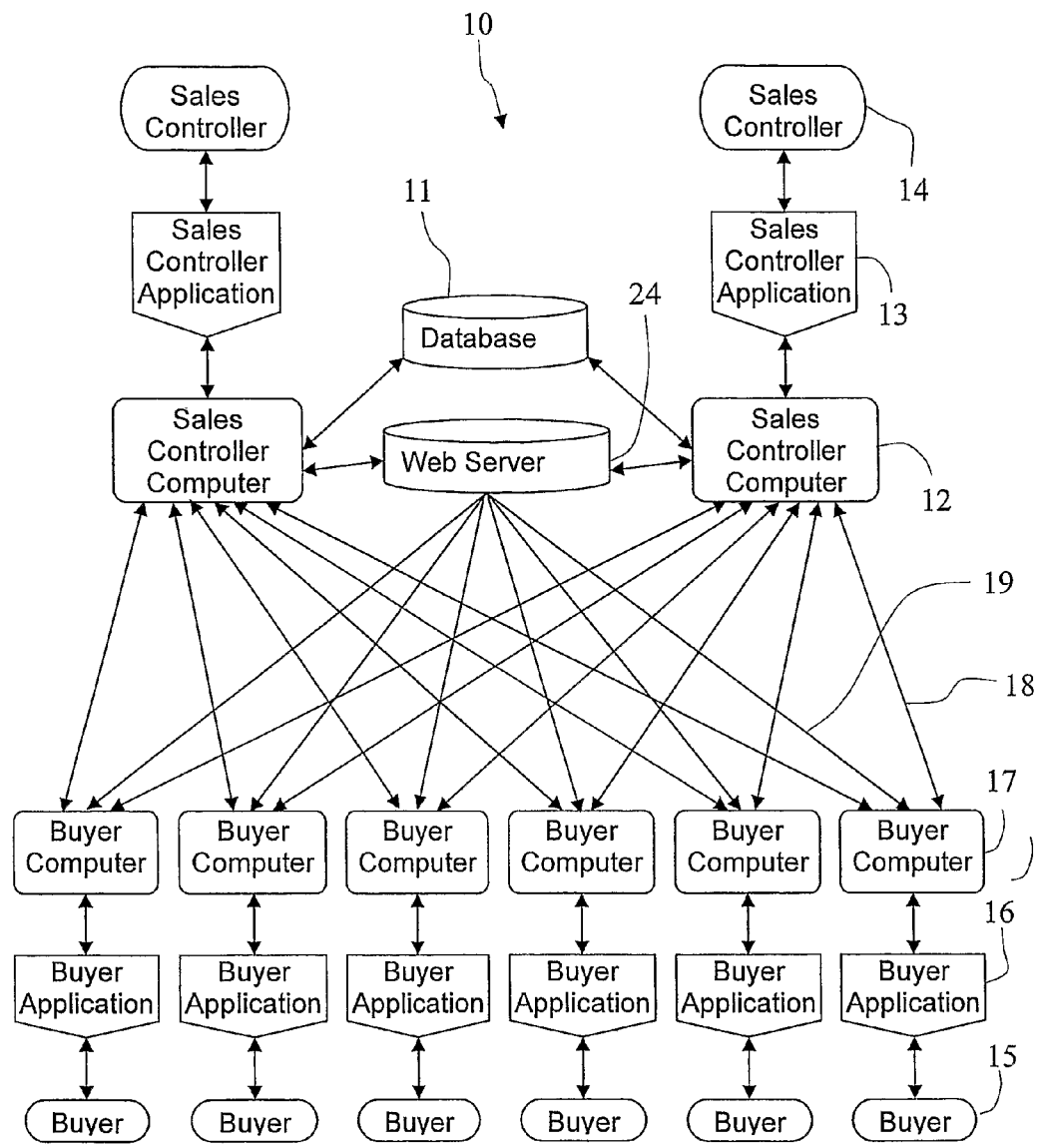

This invention relates to on-line sales including auctions. In particular, it relates to a method and system for real-time, on-line sales including count down and count-up auctions.

BACKGROUND TO THE INVENTION

On-line sales and auction systems are well known. Typical of on-line sales system are web-based direct purchase systems such as shopping carts. These systems allow the purchase of items offered for sale at fixed prices. Typical of on-line auctions is the auction site Ebay™. Ebay is a web-based auction site that allows users to bid for items offered by suppliers. The auction remains open for a fixed period of time. The highest bid before the auction closes receives the goods.

As with most on-line auction sites the Ebay site is a single auction site. By this is meant that suppliers must list their goods on the Ebay site, and only the Ebay site. Other products, such as flowers, are sold through multiple auction sites throughout the world. Generally such auctions require a buyer to be present but recently remote bidding has become available.

Auctions for perishable goods (such as fish, cattle, coffee and organic products) are often run as Dutch auctions. A Dutch auction commences at a start price and the price is gradually reduced until a buyer accepts the price. A Dutch auction is generally faster than an English auction (where buyers bid up the price) because only a single bid is required to close the sale.

One approach to a Dutch auction is to conduct the auction electronically by showing the bid value as a countdown clock. A number of buyers monitor the clock and 'click in' at a price they wish to accept. To 'click in' a buyer located at the auction site may simply push a button. This is most commonly implemented for remote buyers by displaying the countdown clock (often called the auction clock) on a personal computer connected to an auction server and allowing the remote buyer to 'click in' by pushing a key or clicking the mouse. It is convenient for the personal computer of the remote buyer to be connected to the auction server via a direct link, although an internet connection is also possible.

A number of conventional on-line sales and auction systems are known that allow buyers to place a bid on an item when the item reaches a desirable price.

WO 01/53913 discloses a system for conducting a Dutch auction online between a plurality of potential bidders. The system generates a sequence of values for a comparative bid parameter that is used by an originator of the auction to create a first view of the Dutch auction for the originator of the auction. The system also transforms a value selected from the sequence of values into a bidder comparative bid parameter value. The transformed value is used to create a second view of the Dutch auction for the potential bidders to compare. As such, the system allows bidders to transform bids based on the comparative bid parameter values.

CA 2350994 discloses a descending bid auction system that allows pre-registered bids to be submitted to an auction site. The system includes a pricing device, a reserved bidding device, and a bid processing module. The pricing device decrementally alters an auction price for an item. The reserved bidding device allows buyers to pre-register a bid amount, while the bid processing module determines when the pricing device reaches a price matching the pre-registered bid and awards the sale of the item to the buyer that submitted the bid. A remote auction terminal may be used to display multiple clocks regarding multiple products for sale at the auction site.

CA 2394575 discloses an auction system including a server system for sending current price messages and for receiving bid messages, wherein the messages are transmitted using single IP packets. The system includes an interface that includes a clock device for displaying a current price of an item based on the received current price messages.

CA 2489132 and CA 2528781 discloses a method for carrying out a reverse-auction over a network. A potential bidder uses a computer to access a web server that displays a description of an article to be auctioned and a table in association with the description. The table associates a price that diminishes over consecutive intervals of time running from a predetermined starting time and terminating at a predetermined ending time. The server responds to an entry of a bid by correlating the time of entry of the bid to the price associated with the time interval in which the time of entry of the bid occurs and records the price associated with the time of entry of the bid and the identity of the bidder.

EP 0828223 discloses an automatic auction method that makes it unnecessary for a potential bidder to stay before an auction finishes. The method includes the potential bidder selecting an auction subject from an on-line, real-time auction site. The potential bidder then creates ordering information to establish a desired price for the auction subject, a number of items to purchase of the item subject, and a highest possible price the bidder is prepared to go to buy the item subject in competition with other bidders.

Although remote viewing of an auction clock and remote bidding benefits the buyer the buyer is still locked into a single sale at a time. In fact, most remote auction sites require the buyer to download and install proprietary software that is only useful for a single market or auction house.

OBJECT OF THE INVENTION

It is an object of the present invention to provide an on-line real time sales solution that is versatile compared to known systems.

It is a further object to offer a useful alternative to existing on-line sales systems including auctions.

It is a still further object to provide a system that allows a user to simultaneously access multiple auctions at multiple locations.

Further objects will be evident from the following description.

DISCLOSURE OF THE INVENTION

In one form, although it need not be the only or indeed the broadest form, the invention resides in a method of purchasing products including the steps of:

accessing a buyer interface displaying multiple price clocks from multiple sales controller applications, each price clock corresponding to a product offered by a sales controller and each price clock displaying a varying price for that product; and sending a signal to stop a selected one of the price clocks at a desired price to purchase the product.

The product may be a single item or plurality of items formed into a single lot.

In a preferred form a first price clock is associated with a first sales controller and at least another price clock is associated with a different sales controller.

Preferably the buyer interface is part of a buyer application running on a buyer computer. The signal is suitably sent to a sales controller application running on a sales controller computer. The buyer computer and the sales controller computer preferably form a port-to-port network.

Preferably the buyer interface displays images of each product offered with each price clock.

Preferably each sales controller application resides at a different physical location.

In another form the invention resides in a method of offering a product for sale including the steps of:

sending data from multiple sales controller applications accessible by multiple buyer applications, said data including varying price information for display in one of multiple price clocks in an interface of the buyer application;

receiving a stop signal from one of the multiple buyer applications, said signal stopping the varying price information at a selected price; and recording the buyer application that sent the stop signal as the buyer of the product.

In another form the invention resides in a system for real-time on-line sales comprising:

multiple sales controller computers each including a communications modem and each running a sales controller application;

multiple buyer computers each including a communications modem and each running a buyer application, the buyer application including a buyer interface displaying multiple price clocks from multiple sales controller applications;

a database accessible by the sales controller applications and the buyer applications to retrieve product information and price information; and a communication channel between the sales controller computers and the buyer computers to:

transmit price information from the sales controller applications to the buyer applications; and transmit a stop signal from one of the buyer applications to one of the sales controller applications;

wherein the buyer application displays the product information in the buyer interface with a clock displaying a varying price and generates the stop signal when activated by a user.

Preferably the communication channel is a port-to-port network.

Preferably the communication channel is via the internet and the sales controller application compensates for internet time lag of the stop signal by a 'buy log sort' process.

In another form, the invention resides in a system for real-time on-line sales comprising:

a web server;

one or more buyer computers, each buyer computer including a buyer application; and one or more sales controller computers, each sales controller computer including a sales controller application;

wherein the one or more buyer computers are connected to the one or more one sales controller computers via the web server allowing the one or more buyer applications to access multiple sales controller applications and display multiple price clocks from multiple sales controller applications.

The system preferably comprises a database for storing data, the data being accessible by buyer computers and sales controller computers.

More preferably, data is uploaded automatically from the database to the web server when the one or more sales controller computers connects to the web server.

Preferably, an IP address of the one or more sales controller computers is uploaded to the web server when the one or more sales controller computers connects to the web server.

Preferably, the buyer computer and the sales controller computer form a port-to-port network after connecting to the web server.

In another form, the invention resides in a web server for real-time on-line sales comprising:

computer readable program code components configured for processing data sent from multiple sales controller applications running on multiple sales controller computers, said data including varying price information for display in multiple price clocks in an interface of multiple buyer applications running on multiple buyer computers;

computer readable program code components configured for processing a stop signal received from one of the buyer applications, said signal stopping the varying price information at a selected price; and computer readable program code components configured for recording the buyer application that sent the stop signal as the buyer of the product.

The web server preferably comprises computer readable program code components configured for accessing data stored on a database, the data being accessible by both buyer computers and sales controller computers.

More preferably, data is uploaded automatically from the database to the web server when a sales controller computer connects to the web server.

The web server preferably comprises computer readable program code components for establishing a port-to port communication between multiple buyer computers and multiple sales controller computers.

BRIEF DETAILS OF THE DRAWINGS

Figure 2:
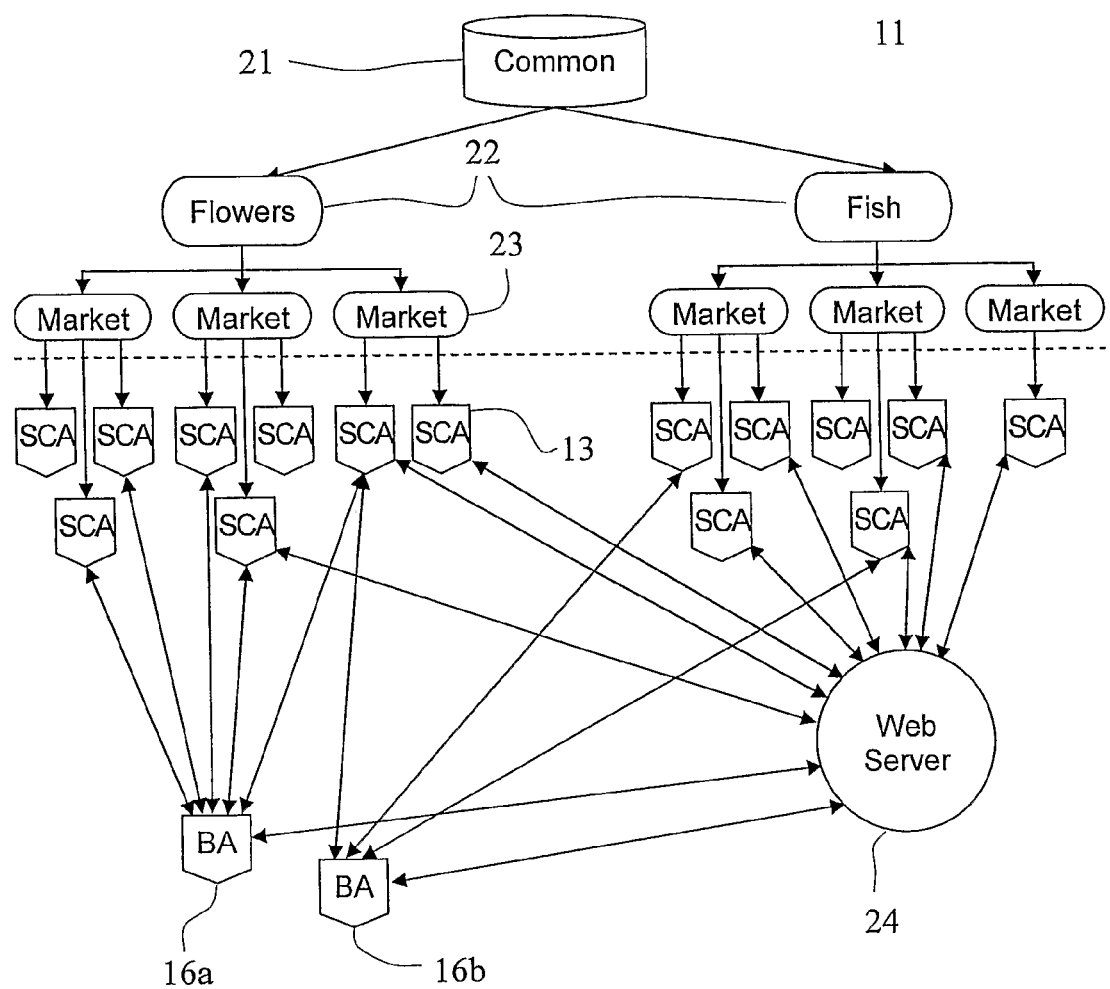
Figure 3:
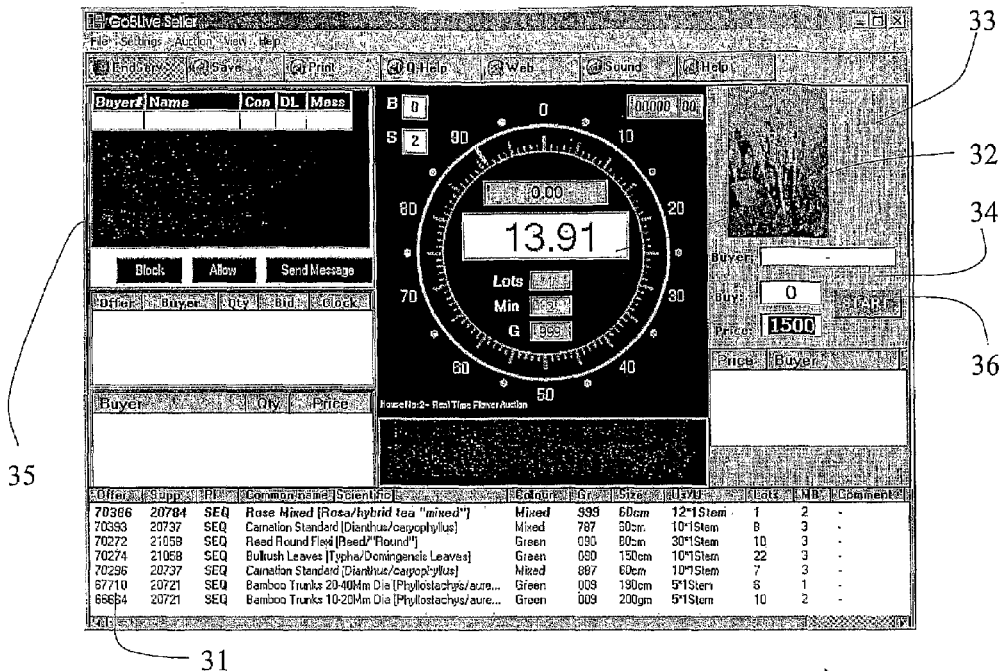
Figure 4:
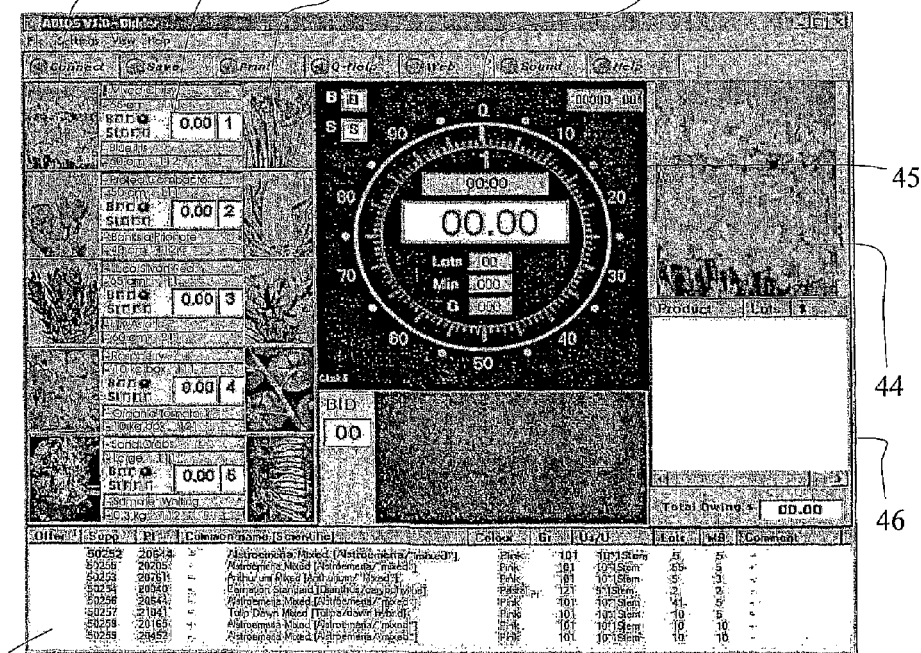
Figure 5:
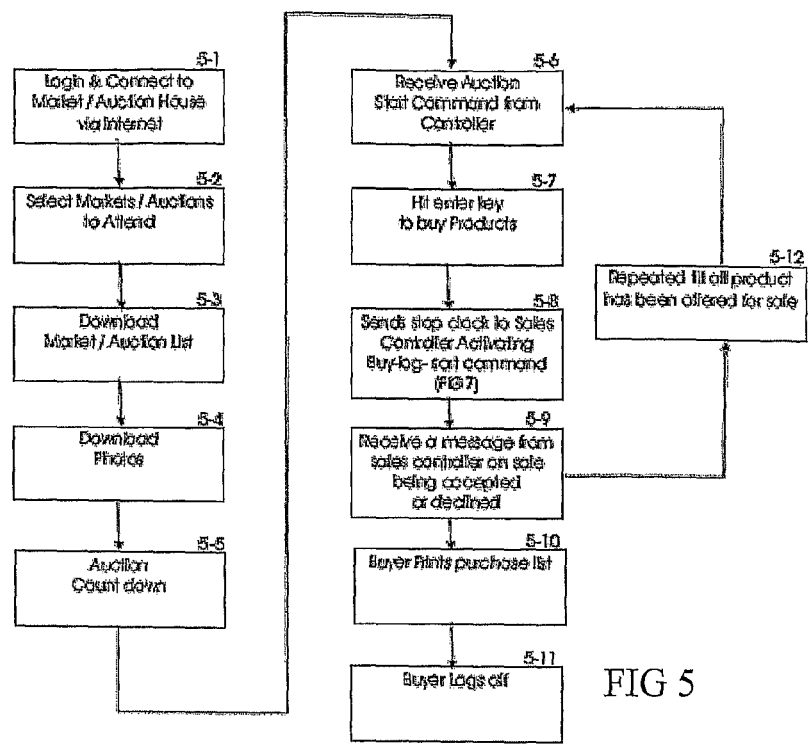
Figure 7:
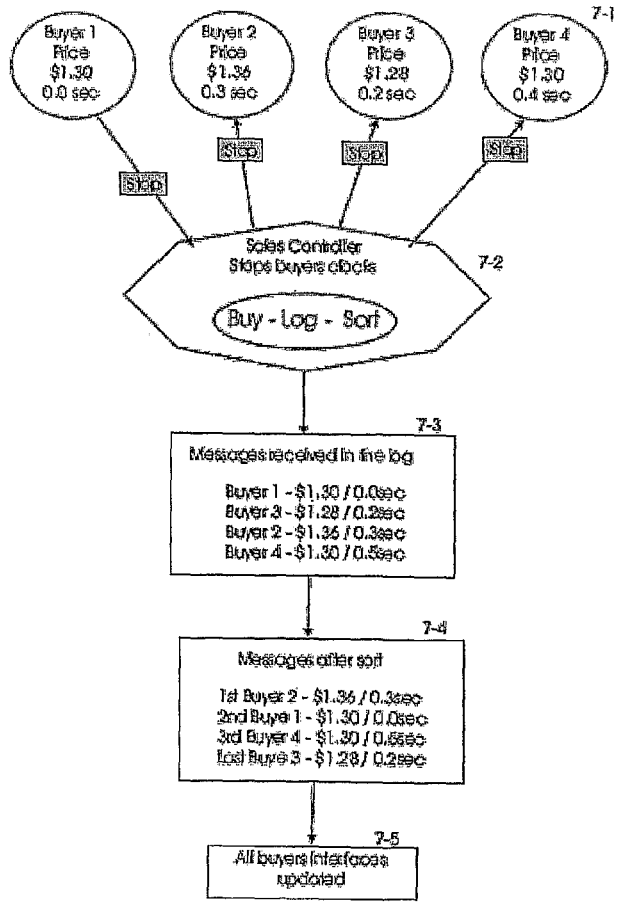
Figure 6:
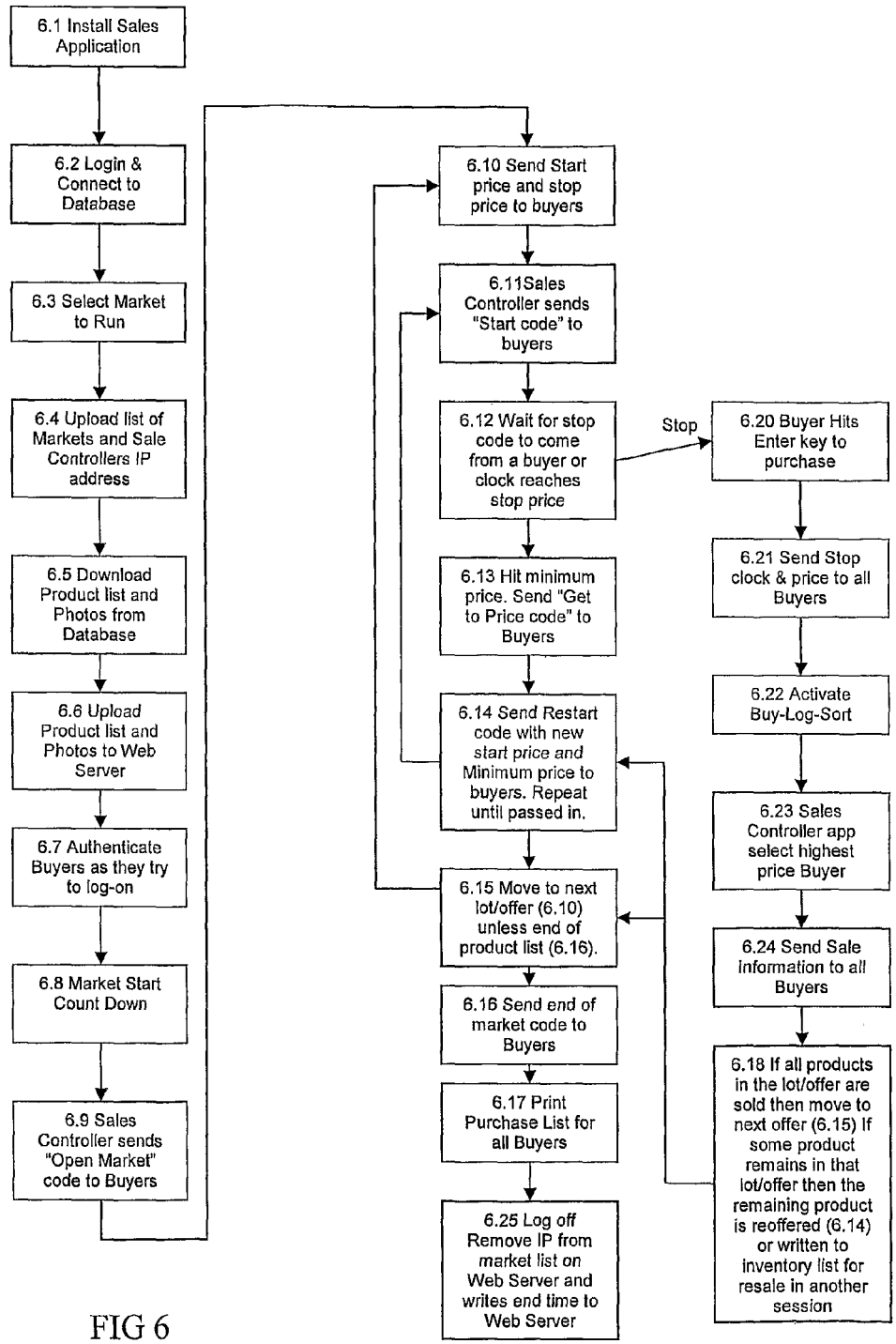

To assist in understanding the invention preferred embodiments will now be described with reference to the following figures in which:

FIG. 1 is a schematic of real-time on-line sales system;
FIG. 2 exemplifies a database structure and connections;
FIG. 3 displays a sales controller interface;
FIG. 4 displays a buyer interface;
FIG. 5 is a flowchart of the buyer process;
FIG. 6 depicts a 'buy-log-sort' process; and
FIG. 7 is a flowchart of the sales controller process.

DETAILED DESCRIPTION OF THE DRAWINGS

In describing different embodiments of the present invention common reference numerals are used to describe like features.

Referring to FIG. 1 there is shown a schematic of a system 10 for a real-time on-line sales system. Central to the system is a database 11 that stores details of products, prices and other information as described in greater detail below. The database 11 is accessed by multiple sales controller computers 12. As further described below each sales controller computer 12 runs a sales controller application 13 which displays a sales controller interface (FIG. 3). A sales controller 14, such as an auctioneer, monitors on-line sales activity via the interface.

Multiple buyers 15 participate in real-time on-line sales, such as auctions, via an interface (FIG. 4) displayed by buyer application 16 running on buyer computer 17. Each buyer computer 17 communicates with one or more sales controller computers 12 via a communications channel, such as 18. Similarly, each sales controller computer 12 may communicate with multiple buyer computers 17 via the same communications channel 18. As is evident in FIG. 1 there are multiple communications channels 18 between buyer computers 17 and sales controller computers 12. Buyer computers 17 also communicate with database 11 via communication channel 19 to access product information.

In order to provide secure communications the preferred embodiment of the invention employs port-to-port network communication between the buyer computer 17 and the sales controller computer 12 via the Internet. The system could also be implemented using client/server communication protocols via a central server running multiple sessions.

Although Internet based communication is preferred the system can also be implemented with direct communication between the sales controller computer 12 and the buyer computer 17.

As mentioned above, the database 11 is central to the real-time on-line sales system. The structure of the database is shown above the dotted line in FIG. 2 together with an indication of the communication channels that facilitate the system. The database 11 is conveniently segmented into common data 21 and product data 22, for example fish and flowers as shown. The products are available in multiple markets 23. For instance a market may be an auction house that specializes in flowers or it may be a wholesaler that sells a range of products. Each market 23 may operate multiple sales controller applications 13 as shown.

The database 11 is populated with details of products being offered for sale together with the date and time of the sale. It is convenient for the product information to be loaded to the database from an inventory application. In a preferred embodiment of the invention the suppliers of product provide the product to a sales controller 14 that arranges the product for sale and allocates the date and time of sale. The supplier arranges photographs of the products and uploads the product information and the images to the database 11, perhaps using a specific image upload application. Although this is a preferred approach the invention is not limited in this way. The inventors envisage that suppliers will upload product information and images directly to the database 11.

As is depicted in FIG. 2, a buyer application 16 may access multiple sales controller applications 13 to participate in multiple sales. For instance, buyer application 16a is shown as accessing three flower markets via five sales controller applications whereas buyer application 16b is shown as accessing a flower market and two fish markets.

The invention allows buyers 15 to be free to roam across multiple sales controllers 14. This is facilitated in part by providing a web server 24 (which may also conveniently host the database 11 although this is not essential). When any sales controller 14 opens a sales controller application 13 and connects to the web server 24 data on sale dates and times is uploaded automatically from the database 11 to the web server 24 as a text file. The IP address of the sales controller computer 12 is also uploaded and stored with the sales being offered by the sales controller 14. The product list and photographs for the market it will control/run is uploaded to the web server. Any sales being offered by the sales controller then become available to verified buyers.

Buyers 15 register with the web server 24 (using previously established user names and passwords) and are able to access a list of available markets (sales), with dates and times, in which they may participate. The buyer selects the markets to join and the buyer application connects the buyer to the sales controller using port-to-port networking between the buyer computer and the sales controller computer. The sales controller application verifies the identity of the buyer and authorizes access to the market. Once port-to-port communication is established and the product list and photographs are released to the buyer application, the web server plays no further part as all necessary information for the market is available through the sales controller application. It will be appreciated that all sales controller applications are essentially equivalent since all access the database 11. Thus it is conceivable that any sales controller can operate any sales providing appropriate permissions are given and the IP address provided. This is particularly advantageous if a sales controller computer has a communications problem at the time of a sale as any other sales controller computer can run the sale in place of the off-line sales controller computer.

To assist with understanding, a specific embodiment of the system will be described as it applies to the auctioning of flowers. Flowers are typically sold by Dutch auction.

The sales controller application provides a sales controller interface 30, as shown in the form of a screen image in FIG. 3 that is displayed on the sales controller computer 12. The sales controller interface 30 is an interface that allows a sales controller (auction house or market house) to offer products for sale. Each sales controller may offer a number of products, which may be offered in lots. Each offering is given an offer number 31 which is displayed at the bottom of the screen. Details of the product are displayed as described above. For example, the particular embodiment displayed is for a number of flower auctions. Each flower offering is described by type, colour, grade, size and number of lots available. An inventory application uploads an image of the flowers to the database 11 for display to buyers 15. The supplier through a web interface or the inventory application may also indicate a starting price and a minimum selling price at which the lot is withdrawn if not sold.

Central to the sales controller interface 30 is a price clock 32 by which the sales controller 14 can monitor the progress of a selected auction. When a flower offering is selected in the lower part of the screen the details are displayed 33, including an image of the product. The price clock counts down from the starting price until a buyer stops the clock and makes the purchase. A sales controller 14 is able to monitor the price clock. When a purchase is made the details of the buyer and the price are displayed 34. The sales controller can also see a list 35 of currently logged in buyers.

The system also provides a buyer interface 40, as shown in the form of a screen image in FIG. 4, that is displayed on the buyer computer 17. A list of products available for auction is provided 41 at the bottom of the screen. As with the sales controller interface 30, the details include the product being offered, the colour, the grade, and the number of lots available. The buyer can select to bid at multiple markets simultaneously. In the particular embodiment depicted in FIG. 4 the buyer is able to select up to five markets, although more or less is possible. For each selected market an image of the product currently offered is displayed 42, together with brief details. Details of the current bid are displayed 43. A picture of the next product 47 to be sold is displayed to the right.

As with the sales controller interface 30, a price clock 48 is central to the buyer interface 40. The buyer selects which of the five available markets is active and the relevant price clock is displayed with an image of the product being offered 44. In the example of FIG. 4 the price clock is set to auction one, as indicated by the number in the price clock 48 at 45. During an auction the price clock starts at an initial price and the clock winds down. Each revolution of the clock reduces the price by one unit (dollar, euro, etc). At any time the buyer can stop the clock by clicking their enter key or a nominated bid key on the buyer computer 17 to purchase the product at the price shown on the clock. A summary of buyer 15 purchases, including total amount payable, is shown in the panel 46 at the bottom right of the interface.

The sales controller application 13 provides services required for conduct of the auction. Buyers register by obtaining a username and password. Details of buyers, sales controllers and product information are stored in database 11, as described earlier. The buyer application 16 can link the buyer to a web interface to mediate payments and provides reports based on data held in the database 11.

The invention can usefully be explained by following the process from the buyer perspective by reference to FIG. 5. Once a buyer has downloaded and installed the buyer application 16 on a buyer computer 17 the buyer may log-in and connect to a sales controller computer via the Internet as depicted in step 5-1. The buyer then selects from the available markets with which the buyer is registered (5-2) and downloads the list of available markets (5-3) and photos of products being offered at each selected market (5-4).

The buyer can register for markets before they commence and will receive notification that a market is about to start (5-5). The relevant sales controller application sends a signal (5-6) to start the relevant price clock in the buyer application and the clock starts to count down or count up depending on the nature of the sale (e.g. Dutch auction or English Auction). The buyer hits the enter key (5-7) to stop the clock at the desired price. The buyer application sends a 'stop clock' signal (5-8) to the sales controller application which activates a 'buy-log-sort' routine described below by reference to FIG. 7. The sales controller application returns a signal to all buyer applications indicating whether the sale has been accepted or declined (5-9). If the purchase is accepted the successful buyer application adds the details of the purchase to the buyer interface. The process repeats for multiple markets and sales (5-10).

Once a buyer has completed their purchase activity the buyer may print the purchase list (5-10) from the buyer application. The buyer application may link the buyer to a web interface to complete payment of purchases, view invoices, print statements and reports, etc before logging-off (5-11).

The sales controller application 13 can usefully be explained by following the process from the perspective of the sales controller 14 by reference to FIG. 6. Once a sales controller 14 installs (6.1) the sales controller application 13 on the sales controller computer 12 the sales controller 14 may log-in and connect to the database 11, preferably via the Internet as depicted in step 6-2.

The sales controller 14 then selects (6.3) from the available markets 23 with which the sales controller is registered and uploads the list of available markets (6-4) to the web server 24 along with the IP address of the sales controller computer 12 (6-4).

The sales controller application 13 then downloads the product list and photographs from the web server 24 for the product being offered at that market (6-5).

The sales controller application 13 then uploads the product list and associated photographs to the web server 24 (6-6) to enable the buyer application 16 to download the product list and associated photographs (as described previously at step 5-3 and step 5-4). At this point the sales controller computer 12 displays the sales controller interface 30 and the sales controller application 13 authenticates the buyer's registration as a buyer tries to log on (6-7).

The sales controller 14 can send a message to the active buyer applications 16a, 16b to indicate the impending start time for the market/auction (6-8). This message is received by the buyer (see step 5-5) and displayed in the buyer interface 40 below the price clock.

Sales controller 14 opens the auction (6-9) by clicking the 'start' button 36, shown in FIG. 3. The sales controller application 13 sends a 'market open' coded message to the buyer application 16 which activates the buyer interface 30 to display the first offer photograph (shown at 34 and 32 in buyer interface 30), details of the first product for sale 31, and the picture and details of the next product to be sold 33.

The first sale is activated by the sales controller 14 entering a start and stop price (or this can also be predetermined by the sales controller, through the inventory application or via the administration application) and hitting the enter key to activate a message which is sent to the buyers computer. This results in a price being displayed on the buyer interface (45). A minimum price may also be sent to the buyer computer 17 which is not displayed to the buyer but which prevents the price clocks of the buyer application and sales controller application from moving below a minimum set price (6-10). The sales controller 14 then hits the enter key (again) to send the start code that activates the clock moving in an anti-clockwise direction (6-11) (clockwise for a count up auction). The sales controller waits (6-12) until a buyer 15 hits their enter key (6-20) to send a stop code or until the clock reaches a minimum price (6-12). The system may or may not enable the sales controller to intervene at any stage between 6.11 and 6.13.

The buyer 15 enters a desired quantity and hits the enter key (6-20) to stop the clock at the desired price. The buyer application sends a 'stop clock' signal to the sales controller application which is relayed to all buyers (6-21) then a 'buy-log-sort' routine (6-22) is activated by the sales controller application (12) (as described below by reference to FIG. 7) to select the highest price (6-23).

The sales controller application 13 returns a signal to all buyer applications (6-24) indicating whether the sale has been accepted and at what quantity and price. The buyer does not need to purchase the whole lot although a sales controller could have set a minimum quantity to be purchased for that lot/offer. Should a buyer purchase the total quantity available then the sales controller application moves to the next product (listed at 31 in FIG. 3) (6-15). Should there be remaining product it maybe re-auctioned immediately or at a subsequent auction (6-18).

In the event that the clock moves down to the minimum price before a buyer activates a sale (6-13), the clock hand will stop on the minimum price and activate a 'calibration' of the buyer's clocks before looping (6-14) back to a start price (6-10), assuming there is more quantity in that lot. The number of loops may or may not be pre-set and/or modified by the sales controller. The process is then reactivated automatically by the sales controller application for a pre-set number of loops (usually three times as is conventional in auctions).

If some or all the quantity in a lot is not sold it is 'passed in' and remains on the inventory list to be uploaded for the next auction (6-18) and the auction moves onto the next product on the list (6-18).

This process is continued until the sales controller application 13 recognizes that the last product has been offered (6-16), whereby the sales controller application automatically sends a message to the buyer application (6-16). The buyer application shows a message in the buyer interface stating the auction has finished.

At this point the sales controller can then print reports of buyer sales (6-17).

The sales controller then hits the "log off" button (6-25) in the sales controller interface which activates the sales controller application to remove the IP address from the market list. The sales controller application then writes the end time of the auction to the market list on the web server.

It will be appreciated that timing problems can arise with multiple buyers accessing a virtual marketplace or auction across a communication network. Each sales controller application 13 handles the timing problem that may arise due to time lags either due to a user's equipment (dialup modem versus broadband) or infrastructure (regional centre versus capital city). Each buyer application and sales controller application runs independently with single package messages being sent to and from each sales controller application at each start and stop of the price clock.

Timing problems are addressed by a 'buy-log-sort' routine described in FIG. 7. When a buyer presses their enter key to buy a product a 'stop/price' signal is sent from the buyer application (7-1 buyer 1) to the appropriate sales controller application and the buy-log-sort routine is initiated (7-2). A stop signal is sent to all buyers logged in to the market to stop the price clock until the transaction is settled (7-1 buyers 2, 3 & 4). The first buyer's stop/price message (including their user identification, number of lots purchased and price) is recorded. If other buyers stop the price clock within a set timeframe as pre-set by the sales controller (say 0.5 seconds) and before the stop/price signal is received, their stop/price message is recorded by the sales controller application (7-2) and displayed in the sales controller interface at 35. All 'buy' messages are placed in the 'buy log sort' pool until the set timeframe expires (7-3). The messages in the pool are then sorted by price and the highest bidder purchases the products (7-4), which is displayed in the sales controller interface at 34). All buyer applications are then sent a message indicating the buy price to update the buyer interface (7-5).

The invention provides an effective system that allows buyers to access multiple markets (auctions) from a single interface without being locked into any particular marketplace or auction house.

Throughout the specification the aim has been to describe the invention without limiting the invention to any particular combination of alternate features.

The invention claimed is:

1. A method of purchasing products via a real-time on-line sales system which includes multiple sales controller computers each running a sales controller application, and a buyer computer running a buyer application which includes a buyer interface, said method including the steps of:
   (i) accessing the buyer interface which displays multiple price clocks from the multiple sales controller applications, each price clock corresponding to a product offered by a sales controller and each price clock displaying a price varying with time for that product; and
   (ii) sending a signal to the sales controller application running on one of the sales controller computers to stop a selected one of the price clocks at a desired price to purchase the product.

2. The method of claim 1 wherein the product is a single item or plurality of items formed into a single lot.

3. The method of claim 1, wherein a first price clock is associated with a first sales controller and at least another price clock is associated with a different sales controller.

4. The method of claim 1, wherein the buyer computer and the sales controller computer form a port-to-port network.

5. The method of claim 1, wherein the buyer interface displays images of each product offered with each price clock.

6. The method of claim 1, wherein each sales controller application resides at a different physical location.

7. A method of offering a product for sale via a real-time on-line sales system which includes multiple sales controller computers each running a sales controller application, and multiple buyer computers each running a buyer application which includes a buyer interface, said method including the steps of:
   (i) sending data from the multiple sales controller applications accessible by the multiple buyer applications, said data including varying price information for display in one of multiple price clocks in the interface of the buyer application;
   (ii) receiving a stop signal sent from one of the multiple buyer applications to the sales controller application running on one of the sales controller computers, said signal stopping the varying price information at a selected price; and
   (iii) recording the buyer application that sent the stop signal as the buyer of the product.

8. A system for real-time on-line sales comprising:
   multiple sales controller computers each including a communications modem and each running a sales controller application;
   multiple buyer computers each including a communications modem and each running a buyer application, the buyer application including a buyer interface displaying multiple price clocks from multiple sales controller applications;
   a database accessible by the sales controller applications and the buyer applications to retrieve product information and price information; and
   a communication channel between the sales controller computers and the buyer computers to:
   transmit price information from the sales controller applications to the buyer applications; and
   transmit a stop signal from one of the buyer applications to one of the sales controller applications;
   wherein the buyer application displays the product information in the buyer interface with a clock displaying a varying price and generates the stop signal when activated by a user.

9. The system of claim 8, wherein the communication channel is a port-to-port network.

10. The system of claim 8, wherein the communication channel is via the Internet and the sales controller application compensates for internet time lag of the stop signal by a 'buy log sort' process.

11. A system for real-time on-line sales comprising:
    a web server;
    one or more buyer computers, each buyer computer including a buyer application; and
    one or more sales controller computers, each sales controller computer including a sales controller application;
    wherein the one or more buyer computers are connected to the one or more sales controller computers via the web server allowing the one or more buyer applications to access multiple sales controller applications and display multiple price clocks from multiple sales controller applications.

12. The system of claim 11, wherein the system further comprises a database for storing data, the data being accessible by buyer computers and sales controller computers.

13. The system of claim 12, wherein data is uploaded automatically from the database to the web server when the one or more sales controller computers connects to the web server.

14. The system of claim 11, wherein an IP address of the one or more sales controller computers is uploaded to the web server when the one or more sales controller computers connects to the web server.

15. The system of claim 11, wherein the buyer computer and the sales controller computer form a port-to-port network after connecting to the web server.

16. A web server for real-time on-line sales comprising:
computer readable program code components configured for processing data sent from multiple sales controller applications running on multiple sales controller computers, said data including varying price information for display in multiple price clocks in an interface of multiple buyer applications running on multiple buyer computers;
computer readable program code components configured for processing a stop signal received from one of the buyer applications, said signal stopping the varying price information at a selected price; and
computer readable program code components configured for recording the buyer application that sent the stop signal as the buyer of the product.

17. The web server of claim 16, wherein the web server further comprises computer readable program code components configured for accessing data stored on a database, the data being accessible by both buyer computers and sales controller computers.

18. The web server of claim 17, wherein data is uploaded automatically from the database to the web server when a sales controller computer connects to the web server.

19. The web server of claim 16, wherein the web server further comprises computer readable program code components for establishing a port-to port communication between multiple buyer computers and multiple sales controller computers.

* * * * *